Oct. 13, 1959    F. B. ROBERTS    2,908,475
BOX FILLING APPARATUS
Filed March 7, 1955    4 Sheets-Sheet 1

INVENTOR.
Frank B. Roberts
BY
ATTORNEY

Oct. 13, 1959

F. B. ROBERTS 2,908,475

BOX FILLING APPARATUS

Filed March 7, 1955

INVENTOR.
Frank B. Roberts
BY
ATTORNEY

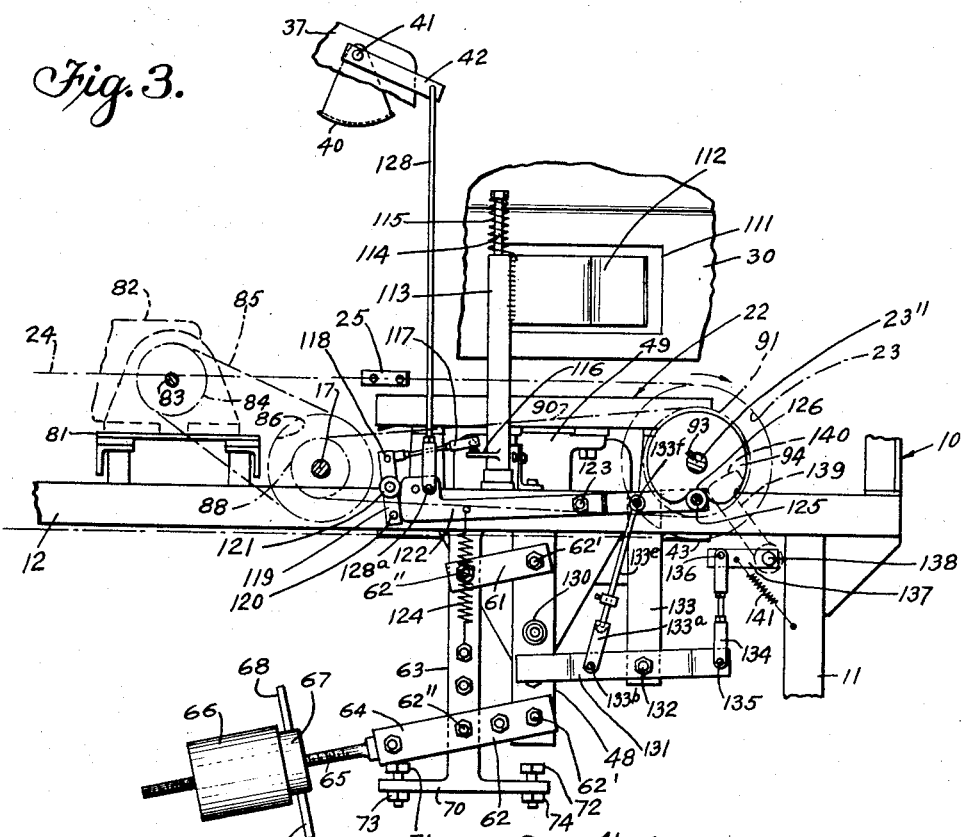

Oct. 13, 1959     F. B. ROBERTS     2,908,475
BOX FILLING APPARATUS
Filed March 7, 1955     4 Sheets-Sheet 4
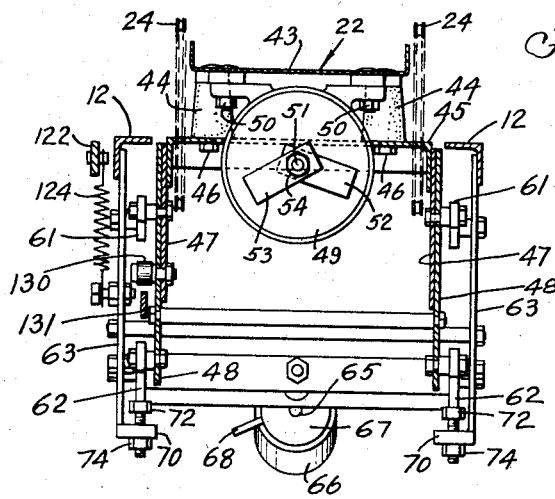
Fig. 9.
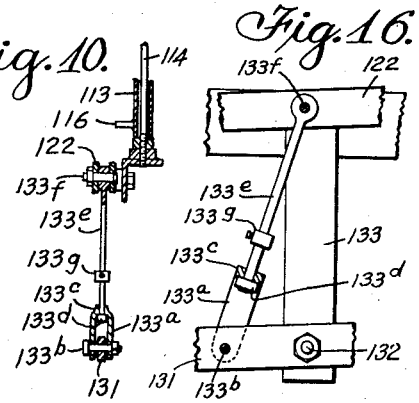
Fig. 10.
Fig. 16.
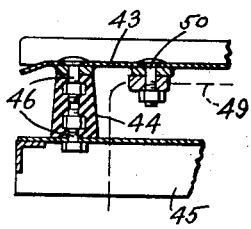
Fig. 11.
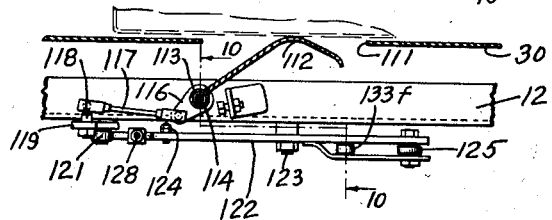
Fig. 12.
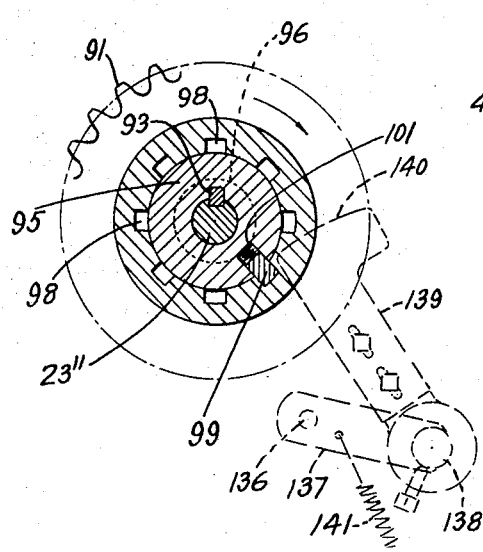
Fig. 14.
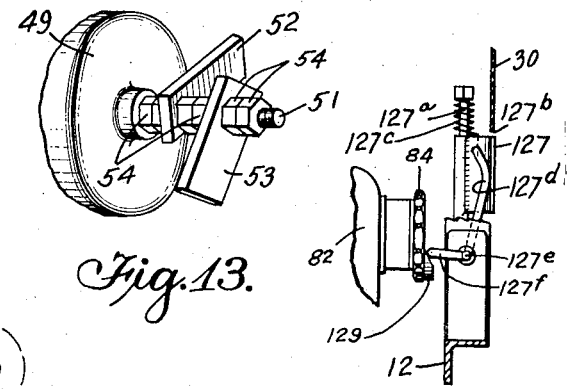
Fig. 13.
Fig. 15.
INVENTOR.
Frank B. Roberts
BY
ATTORNEY

United States Patent Office 2,908,475
Patented Oct. 13, 1959

2,908,475

BOX FILLING APPARATUS

Frank B. Roberts, Anaheim, Calif.

Application March 7, 1955, Serial No. 492,702

2 Claims. (Cl. 249—59)

This invention relates to a box filling apparatus.

The general object of the invention is to provide an improved filling mechanism whereby a desired amount of fruit or other material may be placed in a box or carton.

A more specific object of the invention is to provide an apparatus for filling card board cartons with a desired weight of fruit or other products.

Another object of the invention is to provide weighing mechanism for use in connection with a box filling machine.

A further object of the invention is to provide a novel drive for a box filling machine.

An additional object of the invention is to provide a novel means for vibrating a box while it is being filled.

Another object of the invention is to provide a novel closure control means for a supply chute of a box filling machine.

Other objects and advantages of the invention will be apparent from the following description taken in connection with the accompanying drawings, wherein:

Fig. 3 is an enlarged vertical section taken on line 3—3, Fig. 4;

Fig. 7 is a vertical section taken on line 7—7, Fig. 1;

Fig. 8 is a fragmentary vertical section showing the weighing mechanism;

Fig. 9 is a vertical section taken on line 9—9, Fig. 1;

Fig. 10 is a section taken on line 10—10, Fig. 12;

Fig. 11 is a vertical sectional view showing the scale platform mounting;

Fig. 12 is a plan view partly in section showing the weighing mechanism control;

Fig. 13 is a fragmentary perspective view showing the eccentric weights;

Fig. 14 is a vertical sectional view with parts in phantom showing the chute details, and Fig. 15 is a section taken on line 15—15, Fig. 1, showing the box feed control.

Fig. 16 is an enlarged fragmentary view showing a side elevation of the operating member.

Figures 1, 5, 6:
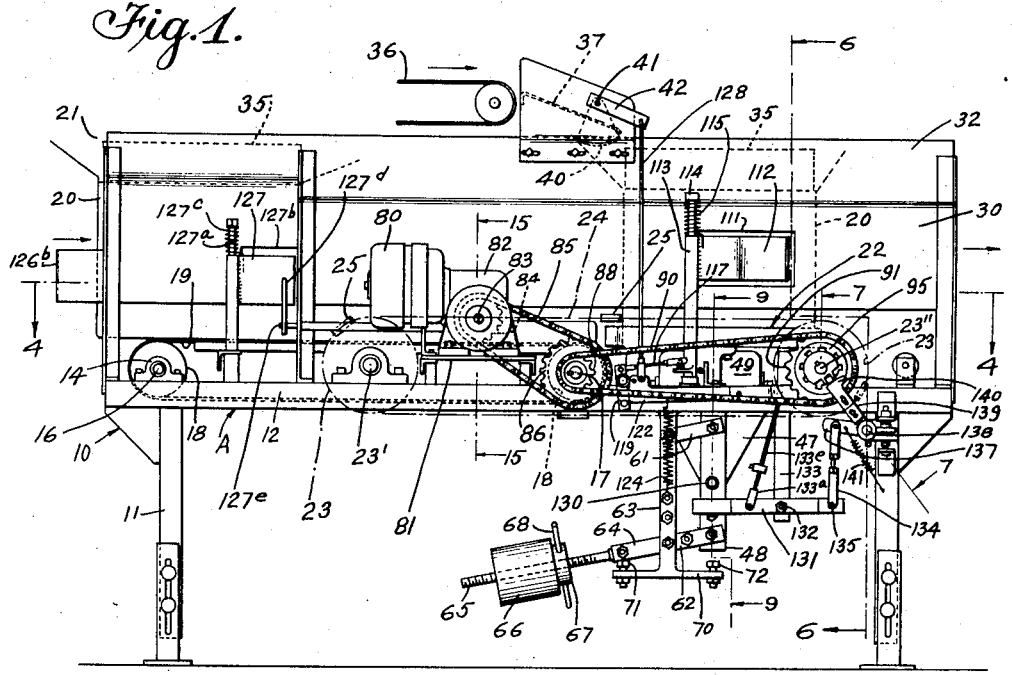
Fig. 1 is a side elevation of a box filling machine embodying the features of my invention.
Fig. 5 is an end view showing the entrance chute of the apparatus.
Fig. 6 is a vertical section taken on line 6—6, Fig. 1.
Figure 2:
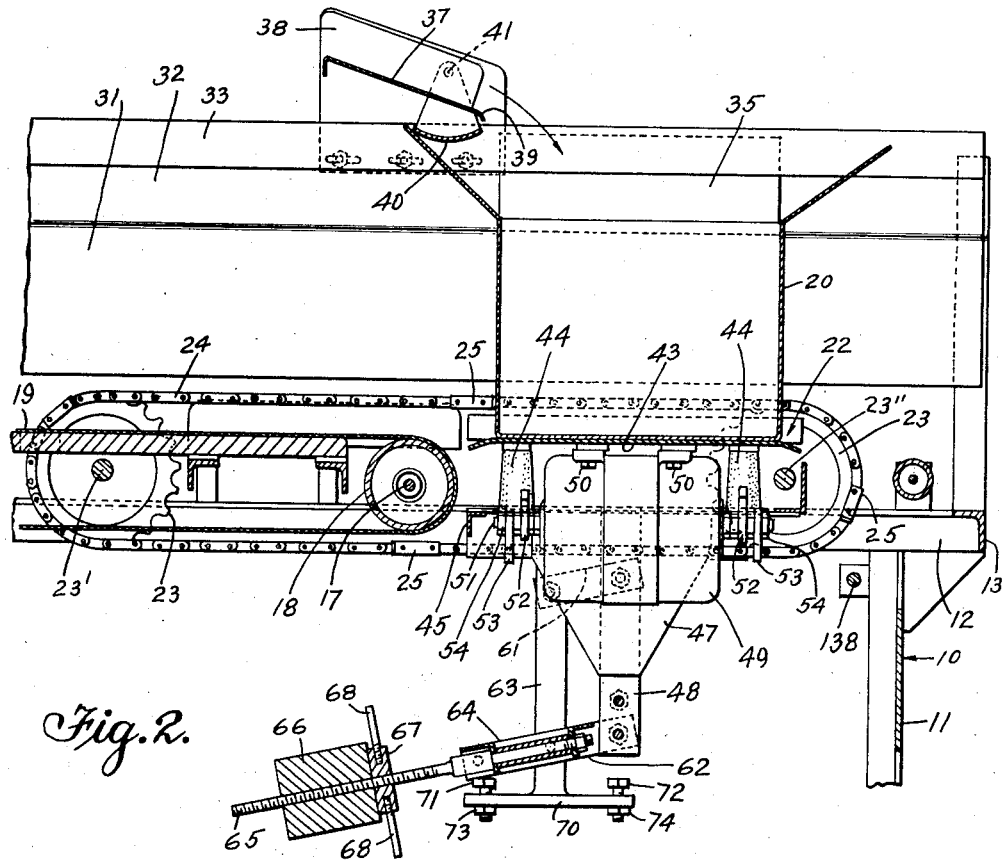
Fig. 2 is an enlarged fragmentary vertical sectional view taken on line 2—2, Fig. 4.
Figure 4:
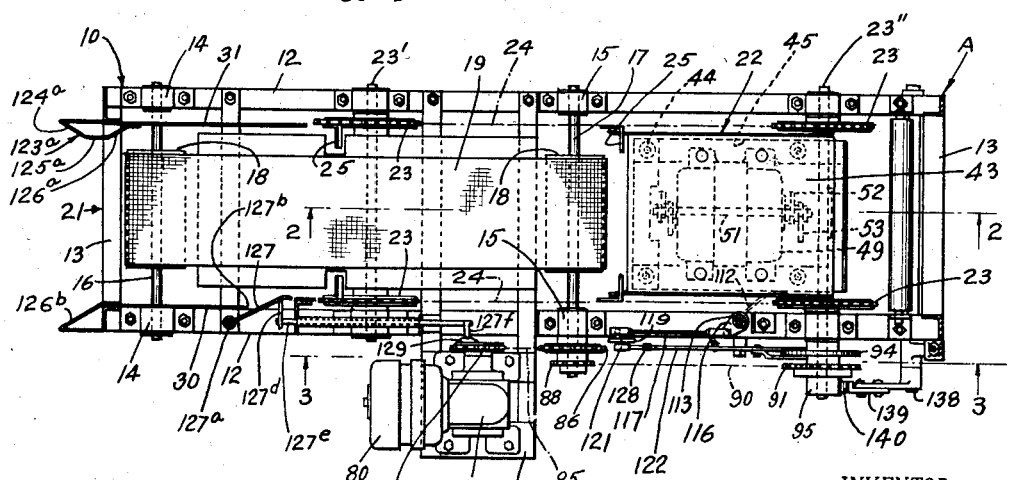
Fig. 4 is a horizontal section taken on line 4—4, Fig. 1.

Referring to the drawing by reference characters the invention is shown as embodied in a carton or box filling machine which is indicated generally at 10. As shown, the machine includes a plurality of legs 11 which support a main frame A. The sides 12 and ends 13 constitute a supporting frame. The main frame A includes spaced sides 12 and ends 13. The sides support pairs of bearings 14 and 15 which in turn support shafts 16 and 17. On the shafts 16 and 17 I mount drums 18 which support an endless conveyor 19. This conveyor is adapted to transport cartons 20 from the entrance end 21 of the machine (Fig. 4) towards the carton filling and weighing station indicated generally at 22 (Fig. 4).

To transport the cartons from the entrance end of the conveyor 19 to the station 22, I provide spaced pairs of sprockets 23 on shafts 23' and 23" which support a pair of chains 24. These chains are spaced apart a distance greater than the width of the carton 20 and opposed spaced flights 25 on the chains are adapted to engage the trailing edges of the cartons 20 as they approach the end of the conveyor 19. The movement of the chains thus causes the flights to move the cartons to the filling station 22, previously mentioned.

The machine includes sides 30 and 31 which serve as guiding members for the cartons 20. The upper parts of the sides are flared outwardly as at 32 and at their upper ends are reversely bent as at 33 to form slots 34 in which the side flaps 35 on the cartons 20 are received and guided.

The side 30 at the entrance end 21 of the machine is of increased width as at 30' to provide a shoulder 30" which forms a stop for cartons as will be later described.

Fruit is supplied by a conveyor 36 which delivers the fruit to an inclined chute 37 which has converging sides 38 thereon. The lower end 39 of the chute is disposed so that fruit passing thereover will enter the carton 20. The lower end of the chute is provided with a closure 40 shown as pivoted at 41 on the chute. The closure includes an operating arm 42 which is rigid with respect to the closure and the construction is such that when the closure is in the position shown in Fig. 3, fruit may pass down the chute 38 into the carton and when the parts are in the position shown in Fig. 8, the closure 40 will prevent fruit from leaving the chute.

At the filling station 22 I provide a platform 43, which receives cartons advanced by the flights 25 on the chains 24. The platform 43 is in fact a scale pan of a weighing device. The platform is mounted on rubber pads 44. The pads are supported on a weighing frame 45 and the parts are held together by means of fastening members shown as bolts 46. The weighing frame has spaced, opposed, depending support plates 47 thereon. The support plates carry depending bars 48.

Beneath the platform 43, I suspend an electric motor 49 by means of spaced bolts 50. The motor 49 is provided with a shaft 51 which is threaded and which is provided with inner and outer weight members 52 and 53. Lock nuts 54 enable the weight members 52 and 53 to be adjusted out of balance so that when the motor 49 is operated the weight distribution will cause the motor to vibrate and this will cause the weighing platform and the carton to be vibrated.

The depending bars 48 on the frame 45 of the platform 43 are pivotally supported by a pair of parallel links 61 and 62 which are pivoted at 62' to the bars 48 and are pivoted at 62" to a depending member 63 which is rigid with the main frame. This parallel link construction permits the platform to move up and down while remaining horizontal. The link 62 is extended as at 64 and supports a threaded rod 65 which has a weight member 66 threadedly mounted thereon. A lock nut 67 which has operating arms 68 thereon serves to support the weight 66 in its correctly adjusted position.

The member 63 has a transverse plate 70 thereon which threadedly receives stop members 71 and 72 which are held in adjusted position by lock nuts 73 and 74. The stop member 71 limits the downward movement of the rod 65 and of the scale platform 43. The stop member 72 limits the upward movement of this rod and of the scale platform.

In order to drive the conveyor 19 and the chain 24 I show a motor 80 mounted on a base 81 fixed on the frame. The motor through a reduction gear mechanism 82 drives a shaft 83 which has a sprocket 84 thereon. The sprocket 84 drives a chain 85 which in turn drives a sprocket 86 on a shaft 87 which has a second sprocket 88 thereon, which latter through a chain 90 drives a sprocket 91 which is mounted on the shaft 23″.

As best shown in Fig. 7 the sprocket 23 is secured to the shaft 23″ by a key 93. The shaft 23″ also has a cam member 94 keyed thereon and also has a sleeve 95 keyed thereon.

The sleeve 95 has a reduced portion 96 thereon which rotatably supports the sprocket 91. The sprocket 91 has a flange 97 thereon which has splined teeth 98 which are engaged by a dog 99 pivoted at 100 to the sleeve 95. The dog is normally pressed into engagement with one of the splined teeth by a spring 101. The construction is such that when the dog 99 is engaged and the motor 80 is in operation the shaft 23″ will be driven by the sprocket 91. The cam member 94 and the sprocket 23 will also be driven to thus cause a carton to be advanced by the flights 25 from the conveyor 24 onto the scale platform 43.

In order to stop progress of a carton at station 22 long enough for it to be filled I provide the side 30 of the machine with an opening 111 in which a control wing 112 is arranged. The control wing is mounted on a column 113 and the column is mounted to rotate on a rod 114 secured to the frame. A spring 115 normally urges to column 113 in the direction so that the wing 112 projects through the opening 111 into the path of a carton on the chains 24.

The column 113 has an arm 116 extending therefrom. The arm 116 pivotally engages one end of a link 117. The other end of the link 117 is pivoted at 118 to an arm 119 pivoted at 120 to the frame. The arm 119 has a roller 121 thereon.

An operating member 122 is pivoted on the main frame at 123 and is normally urged to the position shown in Fig. 3 by a spring 124. The operating member 122 at one end has a roller 125 thereon which when the parts are in the position shown in Fig. 3 fits in a recess 126 in the cam member 94. The other end of the operating member 122 is pivotally connected at 127 to a rod 128 which in turn is connected to the closure operating arm 42. When the parts are in the position shown in Fig. 3 the carton is being filled.

When the parts are in the position shown in Fig. 8 a fresh carton is being advanced to the station 22 and a filled carton is being removed from the station 22. In Fig. 8 it will be noted that the operating member 122 has been rocked clockwise (in a manner to be presently described) and the rod 128 has been lifted to cause the closure 40 to move to chute closing position, also the roller 121 on the arm 119 has moved under the end of the operating member 122 and is holding this member in the position shown in Fig. 8 due to the action of the spring 115.

In order to avoid crowding of a carton awaiting its turn to be advanced by the flights 25 on the chains 24, I provide an abutment member 123a, which includes an inclined portion 124a, a flat portion 125a and a reversely inclined portion 126a. The abutment is so placed that a carton which is being advanced towards the conveyor 19 will engage the portion 124a of the abutment and will be forced laterally so that it will pass the flat portion 125a of the abutment. This will cause the leading end of the carton to engage the shoulder 30″ previously mentioned. The shoulder will prevent the conveyor 19 from moving the carton.

To release a carton held by the shoulder I provide a wing 127 which is mounted on a vertical rod 127a. The wing is movable through a slot 127b in the side 30 of the machine and is normally urged outwardly by a spring 127c. In order to move the wing 127 inwardly to free a carton from the shoulder 30″, I provide an arm 127d which engages the wing. The arm is mounted on an elongated rod 127e which has a crank member 127f thereon remote from the arm. The elongated member engages a cam 128 arranged on the sprocket 84 which is driven by the gear box 82. The cam 128 is so placed that it will rock the crank 127f and will cause the arm 127d to move the wing 127 inwardly to free a carton from the shoulder 30aa at the same time the chains 24 are moving one carton away from the scale platform 43 and are moving another carton onto the scale platform.

The manner in which the machine operates to cause it to cycle when a carton on the scale platform has received a desired weight of fruit will now be described.

Assuming that the carton is on the platform 43 and that the parts are in the position shown in Fig. 3 and that the weight 66 has been adjusted as desired. When the weight of fruit and carton on the platform 43 has become sufficiently heavy the weight 66 will move upwardly and the platform will move downwardly until an actuating member such as a roller 130 mounted on the member 60 moves in a path to engage a lever 131 which is pivoted at 132 to a support 133 rigid on the frame. The roller 130 will then rock the lever 131 in a counter clockwise direction. This will cause a link 133a, pivoted at 133b to the lever 131, to be lowered. The link 133a includes a shoulder 133c which engages a head 133d on a companion link 133e pivoted at 133f to the operating member 122. The construction is such that when the lever 131 is rocked counter clockwise by the roller 130 the operating member will be moved to the position shown in Fig. 8 and the closure 40 will be moved so that the discharge of fruit into the carton will abruptly cease.

The link 133e includes a stop member 133g which when the parts are in the position shown in Fig. 8, engages the end of the link 133a and prevents rotation of the lever 131 by the spring 141.

The rocking of the lever 131 will also cause a link 134 pivoted to the lever at 135 to be raised. This link 134 is pivoted at 136 to a crank member 137 mounted on a shaft 138. The crank member 137 is rigid with respect to the clutch operating member 139 and consequently when the link 134 rocks the crank member 137 the clutch operating member will be moved clockwise so that a pad 140 on the clutch member which in the position shown in Fig. 3 engages the dog 99 and holds the dog out of its spline groove 98 so that the shaft 23 is disengaged from the continuously driven sprocket 91 will release the dog, as shown in broken lines in Fig. 14.

This will cause the dog 99 to move to the position of Fig. 7 to engage the sprocket 91 to cause rotation of the shaft 23″ and the sprocket 23 which carry the chains 24. A spring 141 normally urges the crank member 137 to the position of Fig. 3 wherein the dog is disengaged and the action of the link 134 is against the spring 141. Movement of the chains 24 will carry the carton which has just been filled away from the scale platform 43.

When the carton clears the control wing 112 the arm 116 will be rocked thus moving the arm 119 and causing the roller 121 to move under the operating member 122 as shown in Fig. 8. Thus the operating member will be held so that the closure 40 remains closed and the cam roller 125 will not be permitted to drop into the cam groove 126 even after the carton has left the scale platform until the wing 112 has been swung by an advancing carton to move the roller 121 from beneath the operating member 122.

When an advancing empty carton strikes the wing 112 and rocks the wing it will cause the roller 121 to move from the position of Fig. 8, beneath the operating member 122, to its position shown in Fig. 3 which leaves the operating member free to move. When the cam member 94 has rotated to a position to cause the cam roller 125 to move into its cam groove the operating member 122 will be rocked by the spring 124, the closure 40 will be moved to open position and fruit will move into the carton.

A stop member 145 on the link 133 normally holds the lever 131, link 134, crank member 139 and clutch pad 140 in clutch engaged position. When the operating member 122 is released by an empty box passing onto the scale platform the rocking of the member 122 will cause the stop member 145 on the link 133 to move away from the link 133a to permit rocking of the lever 131 and the crank member 136 by the spring 141 to cause the pad member to be moved to position to free the clutch dog 99 so that further rotation of the sprockets 23 will be stopped.

Having thus described the invention, I claim:

1. In a carton filling machine, a frame, a pair of spaced shafts mounted on said frame, a pair of spaced sprockets keyed on each of said shafts, a pair of chains on said sprockets, said chains having opposed carton engaging flights thereon, means to deliver cartons to a position for engagement by the chain flights, a motor on said frame, a sprocket driven by said motor, an intermediate shaft on said frame and disposed between the axes of said pair of shafts, a sprocket on said intermediate shaft, a chain engaging said last mentioned sprocket and said motor driven sprocket, a second sprocket on said intermediate shaft, a sprocket loose on one of said pair of spaced shafts, a chain connecting said two last mentioned sprockets, clutch means normally tending to clutch said loose sprocket to said one shaft, means operable to hold said clutch means disengaged, a vertically mounted weighing platform adapted to receive cartons advanced by said chain flights, a chute positioned to discharge fruit into a carton on the platform, an operating member pivotally mounted on the frame, a lever pivoted on said frame, means connecting the operating member and the lever so that when the lever is rocked the operating member will be rocked, an actuating member carried by said platform and movable with the platform for rocking said lever and thereby rocking said operating member when the platform moves downwardly, means operated by said lever for causing said clutch means to be engaged to thereby cause said flight chains to move a filled carton from the platform, and means operated by movement of a carton onto the platform to cause the clutch means to be disengaged.

2. In a carton filling machine, a frame, a pair of spaced shafts mounted on said frame, a pair of spaced sprockets keyed on each of said shafts, a pair of chains on said sprockets, said chains having opposed carton engaging flights thereon, means to deliver cartons to a position for engagement by the chain flights, a motor on said frame, a reduction gear driven by said motor, said reduction gear including a shaft, a sprocket on said reduction gear shaft, an intermediate shaft on said frame and disposed between the axes of said pair of shafts, a sprocket on said intermediate shaft, a chain engaging said last mentioned sprocket and said gear reduction shaft sprocket, a second sprocket on said intermediate shaft, a sprocket loose on one of said pair of spaced shafts, a chain connecting said two last mentioned sprockets, clutch means normally tending to clutch said loose sprocket to said one shaft, means to hold said clutch means disengaged, a weighing platform adapted to receive cartons advanced by said chain flights, means carried by said frame and supporting said weighing platform for vertical movement, said last mentioned means including a weighted member normally holding the platform up and operable to allow the platform to move downwardly when the weight on the platform reaches a predetermined amount, means to vibrate said platform, a chute positioned to discharge fruit into a carton on the platform, an operating member pivotally mounted on the frame, closure means for the chute, means whereby swinging movement of the operating member moves the closure means to and from closed position, a lever pivoted on said frame, means connecting the operating member and the lever so that when the lever is rocked the operating member will be rocked, an actuating member carried by said platform and movable with the platform for rocking said lever when the platform moves downwardly to thereby move the closure to closed position, other means operated by said lever for causing said clutch means to be engaged to thereby cause said flight chains to move the filled carton from the platform while the chute closure is in closed position, cam operated means engaging said operating member to hold the operating member in chute closing position while the filled carton is advancing, means in the path of and operated by movement of an empty carton onto the weighing platform for releasing the holding means to cause said closure to open, and means operated by engagement with an empty box on the platform to cause the clutch to be disengaged.

References Cited in the file of this patent

UNITED STATES PATENTS

| | | |
|---|---|---|
| 870,895 | Mitchell | Nov. 12, 1907 |
| 1,192,852 | Bruton | Aug. 1, 1916 |
| 1,729,991 | Bond | Oct. 1, 1929 |